(12) United States Patent
Chen et al.

(10) Patent No.: US 11,671,854 B2
(45) Date of Patent: Jun. 6, 2023

(54) CELL BEAM FAILURE PROCESSING METHOD, MOBILE COMMUNICATION TERMINAL AND NETWORK SIDE DEVICE

(71) Applicant: VIVO MOBILE COMMUNICATION CO., LTD., Guangdong (CN)

(72) Inventors: Li Chen, Chang'an Dongguan (CN); Peng Sun, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 29 days.

(21) Appl. No.: 17/169,363

(22) Filed: Feb. 5, 2021

(65) Prior Publication Data

US 2021/0168631 A1    Jun. 3, 2021

Related U.S. Application Data

(63) Continuation of application No. PCT/CN2019/098113, filed on Jul. 29, 2019.

(30) Foreign Application Priority Data

Aug. 7, 2018    (CN) .......................... 201810892074.9

(51) Int. Cl.
*H04W 24/00*    (2009.01)
*H04W 24/04*    (2009.01)
*H04W 76/18*    (2018.01)

(52) U.S. Cl.
CPC ........... *H04W 24/04* (2013.01); *H04W 76/18* (2018.02)

(58) Field of Classification Search
CPC ..... H04W 24/04; H04W 76/18; H04W 76/19; H04W 16/28; H04W 74/0833; H04B 7/0602
USPC .......................................... 455/423; 370/338
See application file for complete search history.

(56) References Cited

U.S. PATENT DOCUMENTS

| 2018/0097556 | A1 | 4/2018 | Nagaraja et al. |
| 2018/0206170 | A1 | 7/2018 | Nagaraja et al. |
| 2018/0219604 | A1 | 8/2018 | Lu et al. |
| 2019/0297537 | A1* | 9/2019 | Tsai .................. H04W 72/14 |
| 2020/0037332 | A1* | 1/2020 | Da Silva ............ H04L 5/0023 |

(Continued)

FOREIGN PATENT DOCUMENTS

| CN | 106879010 A | 6/2017 |
| CN | 107079459 A | 8/2017 |

(Continued)

OTHER PUBLICATIONS

European Search Report dated Aug. 5, 2021, as received in application No. 19848044.4.

(Continued)

*Primary Examiner* — Marcos Batista
(74) *Attorney, Agent, or Firm* — Maschoff Brennan (57) ABSTRACT

A cell beam failure processing method, a mobile communication terminal and a network side device. The cell beam failure processing method applied to a mobile communication terminal comprises: performing a detection operation on a target cell, the detection operation at least comprising a beam failure detection; and according to a detection result, performing, in the target cell, a first operation of accelerating beam failure processing.

17 Claims, 3 Drawing Sheets

(56) References Cited

U.S. PATENT DOCUMENTS

2021/0058998 A1  2/2021  Yuan et al.
2021/0345191 A1* 11/2021  Da Silva .............. H04W 74/04

FOREIGN PATENT DOCUMENTS

| CN | 108023630 A | 5/2018 |
| JP | 2021519552 A | 8/2021 |
| WO | 2018/126849 A1 | 7/2018 |

OTHER PUBLICATIONS

Medium Access Control (MAC) protocol specification (Release 15), 3GPP TS 38.321 V15.2.0, Jun. 2018. Technical Specification Group Radio Access Network.

Revised Summary 1 on Remaining issues on Bean Failure Recovery Document for: Discussion, 3GPP TSG RAN WG1 Meeting #92bis, R1-1805583, Sanya, China, Apr. 16, 2018. MediaTek Inc.

"RAN2 aspects of DL beam management" 3GPP TSG-RAN WG2#99bis, R2-1710562, Prague, Czech Republic, Oct. 9, 2017. Huawei.

"BFR on SCell" 3GPP TSG-RAN WG2#101bis, R2-1804483, Sanya, China, Apr. 16, 2018. CATT.

"Further issues with DL BWP switching for CFRA" 3GPP TSG-RAN WG2 AH-1807, R2-1809515, Montreal, Canada, Jul. 2, 2018. CATT.

Vivo, "Beam recovery based on NR-PDCCH and NR-PDSCHH," 3GPP TSG RAN WG1 Meeting #89, R1-1707245, pp. 1-6, (May 15-19, 2017).

Interdigital, Inc., "On Remaining Details of Beam Failure Recovery," 3GPP TSG RAN WG1 Meeting #90, R1-1714142, pp. 1-4, (Aug. 21-25, 2017).

Huawei et al., "Beam Failure Recovery Design Details," 3GPP TSG RAN WGI Meeting AH NR#3, R1-1715468, pp. 1-12, (Sep. 18-21, 2017).

Huawei et al., "Discussion on Beam Failure Detection for Beam Management," 3GPP TSG-RAN WG4 Meeting #86bis, R4-1804790, pp. 1-3, (Apr. 16-20, 2018).

Written Opinion of the International Searching Authority dated Feb. 18, 2021 as received in Application No. PCT/CN2019/098113.

CN Office Action dated Dec. 1, 2020 as received in Application No. 201810892074.9.

CN Second Office Action dated May 28, 2021 as received in Application No. 201810892074.9.

Japanese Office Action dated Apr. 18, 2022 as received in application No. 2021-506673.

"Beam failure recovery" 3GPP TSG RAN WG1 Meeting #89 R1-1708135 Hangzhou, China, May 15-19, 2017, Huawei, HiSilicon.

* cited by examiner

CELL BEAM FAILURE PROCESSING METHOD, MOBILE COMMUNICATION TERMINAL AND NETWORK SIDE DEVICE

CROSS REFERENCE TO RELATED APPLICATIONS

This application is a continuation application of International Application No. PCT/CN2019/098113 filed on Jul. 29, 2019, which claims priority to Chinese patent Application No. 201810892074.9 field on Tuesday, Aug. 7, 2018 in China, which is incorporated herein by reference in its entirety.

TECHNICAL FIELD

The present disclosure relates to the field of communications technologies, and in particular, to a cell beam failure processing method, a mobile communication terminal, and a network side device.

BACKGROUND

In a future 5th Generation (5G) mobile communications system, in order to achieve a downlink transmission rate of 20 Gbps and an uplink transmission rate of 10 Gbps, high-frequency communication and a large-scale antenna technology will be introduced. High-frequency communication can provide a wider system bandwidth, and an antenna size can be smaller, which better facilitates the deployment of large-scale antennas in base stations and user equipment (UE).

In a 5G communication system, a beam failure often occurs in high-frequency communication due to the fragility of links. Currently, beam failure instances are counted by using at least one of a counter and a timer to detect a beam failure, so as to achieve beam failure detection. A current beam failure recovery procedure includes: detecting a beam failure, identifying a new candidate beam, transmitting a beam failure recovery request, and monitoring, by a terminal, a response of a base station to the beam failure recovery request. In other words, during current beam failure processing, beam failure recovery is performed, provided that a beam fails. However, current beam failure recovery takes a long time, causing a problem that the terminal cannot restore a connection to a cell in time.

SUMMARY

Embodiments of the present disclosure provide a cell beam failure processing method, a mobile communication terminal, and a network side device, to solve a problem that a terminal cannot restore a connection to a cell in time because beam failure recovery takes a long time in related technologies.

To resolve the foregoing technical problem, the present disclosure is implemented as follows:

According to a first aspect, an embodiment of the present disclosure provides a cell beam failure processing method, applied to a mobile communication terminal, and including:
performing a detection operation in a target cell, where the detection operation includes at least beam failure detection; and
performing, in the target cell based on a detection result, a first operation of accelerating beam failure processing.

According to a second aspect, an embodiment of the present disclosure provides a cell beam failure processing method, applied to a network side, and including:
receiving indication information sent by a mobile communication terminal based on a detection result, where the detection result includes at least a result of beam failure detection performed for a target cell; and
performing, based on the indication information, a second operation of accelerating beam failure processing.

According to a third aspect, an embodiment of the present disclosure provides a mobile communication terminal, including:
a detection module, configured to perform a detection operation in a target cell, where the detection operation includes at least beam failure detection; and
a first execution module, configured to perform, in the target cell based on a detection result, a first operation of accelerating beam failure processing.

According to a fourth aspect, an embodiment of the present disclosure provides a network side device, including:
a receiving module is configured to receive indication information sent by the mobile communication terminal based on a detection result, where the detection result includes at least a result of beam failure detection performed for a target cell; and
a second execution module, configured to perform, based on the indication information, a second operation of accelerating beam failure processing.

According to a fifth aspect, an embodiment of the present disclosure provides a mobile communication terminal, including: a memory, a processor, and a computer program stored in the memory and executable on the processor, where the computer program, when executed by the processor, implements steps of the cell beam failure processing method according to the first aspect.

According to a sixth aspect, an embodiment of the present disclosure provides a network side device, including: a memory, a processor, a transceiver, and a computer program stored on the memory and executable on the processor, where the computer program, when executed by the processor, implementing steps of the cell beam failure processing method according to the second aspect.

According to a seventh aspect, an embodiment of the present disclosure provides a computer readable storage medium, where the computer readable storage medium stores a computer program, and the computer program, when executed by a processor, implements steps of the cell beam failure processing method according to the first or second aspect.

In a beam failure detection process in related technologies, a physical layer indicates a beam failure instance to a Media Access Control (MAC) layer when a particular condition is satisfied, and the MAC layer determines whether the beam fails by counting beam failure instances periodically indicated by the physical layer. For example, at the MAC layer, a timer and counter are started to determine a beam failure. If an instance is received before the timer expires, the counter is increased by 1 and the timer is restarted; otherwise, if no instance is received before the timer expires, the counter is reset. When the counter reaches a preset quantity of times, it is determined that a beam failure event occurs.

The physical layer periodically reports detection events, and the MAC layer manages the periodically reported events by using the counter and the timer to determine whether a beam failure event occurs. In this manner, because a failure detection phase takes a long time, it also takes a long time for a beam to recover from a failure.

In specific embodiments of the present disclosure, the detection operation including at least beam failure detection is performed in the target cell. Based on the detection result of the physical layer, the first operation that can accelerate beam failure processing is performed in the target cell, for example, directly initiating beam failure recovery, directly triggering a radio link failure procedure, directly triggering failure instance reporting, and reporting to a network side. In this way, the terminal can directly perform the first operation when the target cell detects a beam failure, so that the terminal can recover from the beam failure as early as possible.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure. "And/or" used in the specification and claims means at least one of the connected objects.

Figure 1:
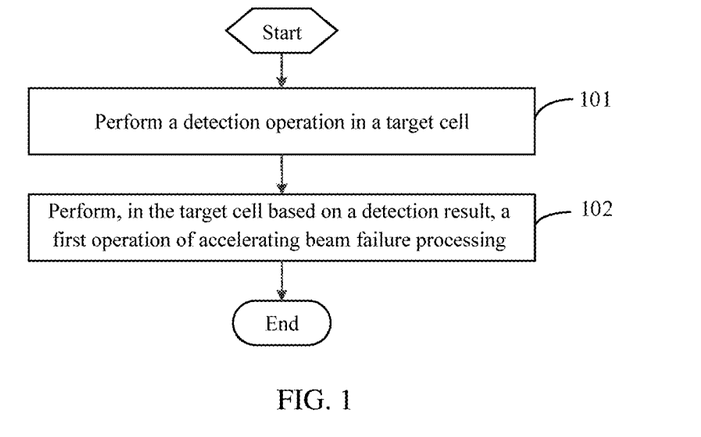
FIG. 1 is a flowchart of a cell beam failure processing method according to an embodiment of the present disclosure.

Referring to FIG. 1, FIG. 1 is a flowchart of a cell beam failure processing method according to an embodiment of the present disclosure. The method is applied to a mobile communication terminal, and as shown in FIG. 1, includes the following steps.

Step 101: Perform a detection operation in a target cell.

It should be noted that the mobile communication terminal may be a terminal side device such as a mobile phone, a tablet personal computer, a laptop computer, a personal digital assistant (PDA for short), and a mobile Internet device (MID) or a wearable device. A specific type of the mobile communication terminal is not limited in this embodiment of the present disclosure. The mobile communication terminal is within coverage of at least one cell, and may establish a connection to at least one cell.

In this embodiment of the present disclosure, the target cell may be one of the following cells. For example, the target cell may be a secondary cell (SCell), or may be a primary cell, where the SCell may be an SCell in a carrier aggregation (CA) scenario, or may be an SCell in a master cell group (MCG) or a secondary cell group (SCG) in a dual connectivity (DC) architecture. The primary cell may be a primary cell (PCell) in the CA scenario, or may be a PCell in the MCG in the DC architecture, or may be a primary secondary cell (PSCell) in the SCG, or may be a special cell (SpCell), where the PCell and the PSCell each can be referred to as a SpCell. In addition, the SCell and the primary cell may correspond to a same base station, or in some scenarios, the SCell and the primary cell may correspond to different base stations, which is not limited.

In this step, the detection operation includes at least beam failure detection. Beam failure detection in a specific embodiment of the present disclosure can be performed by using any beam failure detection solution in related technologies. Meanwhile, a specific embodiment of the present disclosure proposes a new solution for beam failure detection based on a reference signal, and the solution is described as follows.

In a specific embodiment of the present disclosure, the beam failure detection may be: determining, based on measurement performance information obtained by performing detection on a target reference signal on the target cell, whether a beam failure event is detected.

The measurement performance information may be a block error ratio (BLER), and when a BLER obtained by performing detection on the target reference signal is higher than a preset threshold, it is determined that a beam failure event is detected. For example, detection can be performed in the target cell on all reference signals that can be detected, and when measurement performance information obtained by performing detection on all target reference signals does not meet a requirement, it is determined that a beam failure event is detected; or detection can be performed in the target cell on all reference signals that can be detected, and when measurement performance information obtained by performing detection on a preset quantity of target reference signals does not meet a requirement, it is determined that a beam failure event is detected; or detection can be performed on a preset quantity of reference signals configured for the target cell, and when measurement performance information obtained by performing detection on the preset quantity of reference signals does not meet a requirement, it is determined that a beam failure event is detected.

In addition, the measurement performance information may alternatively be RSRP, RSRQ or a SINR. When this measurement performance is lower than a preset threshold, it is determined that a beam failure event is detected.

It should be noted that the target reference signal includes at least one of the following reference signals:

a reference signal configured for the target cell and used for beam failure detection;

a reference signal configured for the target cell and used for a beam failure event;

a reference signal configured for the target cell and used for beam management;

a reference signal that can be detected on the target cell; and a preset quantity of reference signals configured for the target cell.

It can be understood that, when the target reference signal is any one of the foregoing reference signals, it is determined that a beam failure event is detected, provided that the measurement performance information of the target reference signal is detected in the target cell that does not meet the requirement. When the target reference signal configured on the target cell is a set of at least two of the foregoing reference signals, for example, the target reference signal includes the reference signal configured for the target cell and used for beam failure detection, the reference signal configured for the target cell and used for a beam failure event, and the reference signal configured for the target cell and used for beam management, it can be determined that a beam failure event is detected when none of detected measurement performance information of the foregoing three reference signals meets the requirement. Alternatively, it can be determined that a beam failure event is detected when measurement performance information of any two of the foregoing three reference signals does not meet the requirement. In this embodiment of the present disclosure, the target reference signal may alternatively include another combination of reference signals, which is not be described herein in detail.

Step 102: Perform, in the target cell based on a detection result, a first operation of accelerating beam failure processing.

The detection operation includes at least beam failure detection, that is, the first operation of accelerating beam failure processing is performed in the target cell based on a detection result of the beam failure detection.

In a specific embodiment of the present disclosure, the detection operation including at least beam failure detection is performed in the target cell, and based on the detection result of the physical layer, the first operation that can accelerate beam failure processing is performed in the target cell, such as directly initiating beam failure recovery, directly triggering a radio link failure procedure, directly triggering failure instance reporting, and reporting to a network side. In this way, the terminal can directly perform the first operation when a beam failure is detected in the target cell, so that the terminal can recover from the beam failure as early as possible.

In the foregoing embodiment of the present disclosure, that the detection operation includes beam failure detection is used as an example for description. However, considering that when a beam failure occurs, related technologies provide an operation option for beam failure recovery, in a specific embodiment of the present disclosure, whether the beam failure recovery can be successful is further predicted, and whether to perform the first operation of accelerating beam failure processing in a next step is determined based on a success probability of the beam failure recovery.

To be specific, in this embodiment of the present disclosure, the detection operation further includes beam failure recovery condition detection, and step 102 is specifically:

when a beam failure event is detected during the beam failure detection and a beam failure recovery condition is not satisfied, performing, in the target cell, the first operation of accelerating beam failure processing.

To be specific, the detection operation is performed in the target cell, where the detection operation includes at least beam failure detection and beam failure recovery condition detection. The beam failure recovery condition detection may be performed when a beam failure event is detected, and the first operation of accelerating beam failure processing is performed in the target cell when it is detected that the beam failure recovery condition is not satisfied, that is, when a condition for performing beam failure recovery is not satisfied.

In a specific embodiment of the present disclosure, a beam failure recovery condition is set, and a subsequent operation is determined through detection of the beam failure recovery condition. The beam failure recovery condition is a condition for predicting whether the beam failure recovery can be successful. In this embodiment of the present disclosure, the beam failure recovery condition includes at least one of the following conditions:

whether there is an available candidate beam in the target cell;

whether the target cell has an available resource for performing a beam failure recovery procedure; and whether a beam failure recovery failure event corresponding to the detected beam failure event occurs in the target cell.

These conditions are described in detail as follows:

A condition for successful beam failure recovery is: the terminal can switch to a new beam that satisfies a requirement. However, when the target cell is not configured with a candidate beam, or is configured with a candidate beam but measurement performance of a reference signal of the candidate beam does not meet a requirement, the beam failure recovery procedure cannot be successful even if it is performed. Therefore, when the target cell has no available candidate beam, it can be considered that the beam failure recovery condition is not satisfied.

A particular resource is required for initiating beam failure recovery. Therefore, in a specific embodiment of the present disclosure, the beam failure recovery condition may be: whether the target cell has an available resource for performing a beam failure recovery procedure, and when there is no available resource for performing the beam failure recovery procedure, it is considered that the beam failure recovery condition is not satisfied. In this case, the first operation of accelerating beam failure processing needs to be performed.

At present, according to related specifications, beam failure recovery can be attached to a particular procedure. For example, currently beam failure recovery can be implemented by using a contention-free random access (CFRA) procedure or a contention-based random access (CBRA) procedure.

Therefore, in this embodiment of the present disclosure, whether the target cell has an available resource for performing a beam failure recovery procedure specifically includes at least one of the following conditions:

whether the target cell is configured with a first resource used for a contention-free random access CFRA procedure;

whether the target cell is configured with a second resource, where the second resource is a resource used for a CFRA procedure that supports beam failure recovery;

whether a reference signal on the second resource meets a measurement performance requirement;

whether the target cell is configured with a third resource used for a contention-based random CBRA procedure;

whether the target cell is configured with a fourth resource, where the fourth resource is a resource that can be used for a CBRA procedure that supports beam failure recovery; and whether a reference signal on the fourth resource meets the measurement performance requirement.

The condition can be understood as: when the target cell is not configured with the first resource used for the contention-free random access (CFRA) procedure; or the target cell is not configured with the second resource used for the CFRA procedure that supports beam failure recovery (in other words, a resource used for the CFRA procedure is configured but the CFRA procedure is not configured to support beam failure recovery), or a measurement value of a reference signal on the second resource used for the CFRA procedure that supports beam failure recovery does not meet a measurement performance requirement (in other words, the resource used for the CFRA procedure is configured, and the CFRA procedure is configured to support beam failure recovery, but transmission performance of the resource is insufficient to support a procedure success); or the target cell is not configured with the third resource used for the contention-based random access (CBRA) procedure; or the target cell is not configured with the fourth resource used for the CBRA procedure that supports beam failure recovery (in other words, a resource used for the CBRA procedure is configured but the CBRA procedure is not configured to support beam failure recovery); or a measurement value of a reference signal on the fourth resource used for the CBRA procedure that supports beam failure recovery does not satisfy a measurement performance requirement (in other words, a resource used for the CBRA procedure is configured, and CFRA procedure is configured to support beam failure recovery, but transmission performance of the resource is insufficient to support a procedure success. When at least one of the foregoing conditions is not satisfied, it is determined that the target cell has no available resource for performing the beam failure recovery procedure, that is, the beam failure recovery condition is not satisfied.

The reference signal on the second resource used for the CFRA procedure that supports beam failure recovery may include: a synchronization signal block (SSB), a channel state information reference signal (CSI-RS), a demodulation reference signal (DMRS), a cell-specific reference signal (CRS), and the like. The measurement value of the foregoing reference signal can be: reference signal received power (RSRP), reference signal received quality (RSRQ), a signal to interference plus noise ratio (SINR), a BLER, or the like.

For different measurement values, definitions for not satisfying the measurement performance requirement are different. For example, for the BLER, when a measurement value is greater than a preset threshold, it is considered that the measurement performance requirement is not satisfied. For the RSRP or the like, when a measurement value is less than a preset threshold, it is considered that the measurement performance requirement is not satisfied.

The reference signal on the fourth resource used for the CBRA procedure that supports beam failure recovery may also include: an SSB, a CSI-RS, a DMRS, a CRS, and the like. The measurement value of the foregoing reference signal may include: RSRQ, RSRP, a SINR, and the like.

In addition, the beam failure recovery condition may be: whether a failure event of beam failure recovery performed corresponding to a detected beam failure event occurs in the target cell, and when the beam failure event is detected in the target cell, and a beam failure recovery failure event is caused due to a failure to perform beam failure recovery on the beam failure event, it already indicates that the beam failure recovery cannot be successful. Therefore, it can be determined that the beam failure recovery condition is not satisfied, and the first operation of accelerating beam failure processing is performed.

In this embodiment of the present disclosure, the detection operation is performed in the target cell, and when a beam failure event is detected, the beam failure recovery condition is not satisfied, the first operation of accelerating beam failure processing is performed in the target cell, where the first operation may be any operation that can accelerate recovery from a beam failure for the terminal, and includes, for example, at least one of the following operations:

directly initiating the beam failure recovery procedure;
directly triggering a radio link failure RLF;
indicating an upper-layer beam failure instance; and
reporting indication information to a network side.

The direct initiating the beam failure recovery procedure may be: directly performing the CBRA procedure on the SCell, PCell, PSCell, or SpCell, instead of reporting to the MAC layer. The MAC layer determines a beam failure event by using a timer and a counter. Therefore, recovery from a beam failure can be accelerated for the terminal.

In addition, recovery from a beam failure for the terminal can alternatively be accelerated by directly triggering the radio link failure (RLF), or by indicating the upper-layer beam failure instance.

Alternatively, recovery from a beam failure for the terminal can be accelerated by reporting the indication information to the network side so that the network side determines an action based on specific reported information.

It should be noted that the indication information may be reported by adding the indication information into a Media Access Control control element (MAC CE), a physical uplink control channel (PUCCH), or a radio resource control (RRC) message. The indication information may be reported to a network side device through an SCell, PCell, PSCell, or SpCell, where the SCell, PCell, PSCell, or SpCell that reports the indication information to the network side device can be a cell the same as the target cell in which a previously detected beam failure occurs, or may be a cell different from the target cell in which a beam failure occurs.

In a specific embodiment of the present disclosure, the indication information is reported to the network side, and the network side is enabled to perform corresponding processing based on the reported indication information as early as possible, for example, changing the primary secondary cell PSCell or secondary cell SCell, or adding a primary secondary cell PSCell or secondary cell SCell, or perform a cell handover, so that the terminal can recover from a beam failure as early as possible while saving power of the terminal.

In this embodiment of the present disclosure, the indication information may indicate specific failure information and/or a failure event. For example, the indication information may include at least one of the following information:

first information, used to indicate a beam failure on a secondary cell SCell, primary cell PCell, primary secondary cell PSCell, and/or special cell SpCell;

second information, used to indicate a quantity of target reference signals and/or measurement performance information not satisfying the measurement performance requirement;

third information, used to indicate that the target cell has no available candidate beam and/or no measurement performance information of a reference signal of the candidate beam;

fourth information, used to indicate that the target cell has no available resource for performing the beam failure recovery procedure;

fifth information, used to indicate the measurement performance information of a reference signal;

sixth information, used to indicate an alternative beam selected by the mobile communication terminal;

eighth information, used to indicate an event that a preset quantity of reference signals fail;

ninth information, used to indicate an event that a preset reference signal fails and/or a reference signal corresponding to the candidate beam fails;

tenth message, used to indicate an additional reference signal for displaying a configuration;

eleventh information, used to indicate measurement performance information of a reference signal of a resource used for CBRA; and twelfth information, used to indicate measurement performance information of a reference signal, where the reference signal includes at least one of: a reference signal of the candidate beam, reference signals of all beams, a preset quantity of reference signals, and a reference signal of a preset beam.

In this embodiment of the present disclosure, the detection operation including at least beam failure detection is performed in the target cell, and the first operation of accelerating beam failure processing is performed in the target cell based on the detection result. In this way, when a beam failure is detected in the target cell, beam failure processing can be accelerated for the target cell with the beam failure by performing the first operation such as directly initiating the beam failure recovery procedure or reporting the indication information to the network side, to quickly complete the beam failure recovery, and improve a cell beam failure processing capability of the mobile communication terminal.

Figure 2:
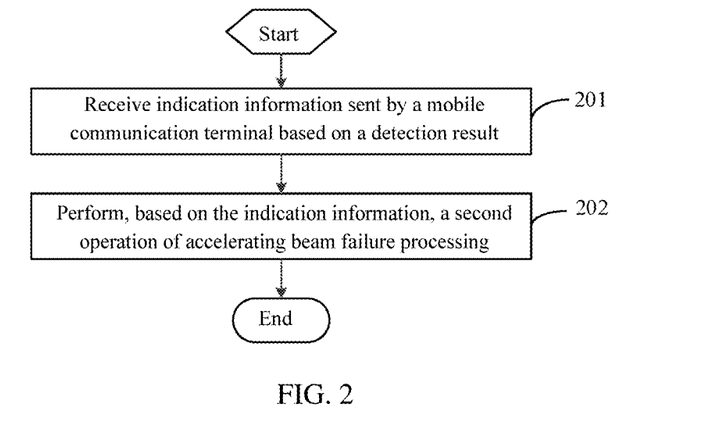
FIG. 2 is a flowchart of another cell beam failure processing method according to an embodiment of the present disclosure.

Referring to FIG. 2, an embodiment of the present disclosure further provides a cell beam failure processing method, applied to a network side. As shown in FIG. 2, the cell beam failure processing method includes the following steps.

Step 201: Receive indication information sent by a mobile communication terminal based on a detection result.

In this embodiment of the present disclosure, the detection result includes at least a result of beam failure detection performed for a target cell. That is, the mobile communication terminal performs a detection operation of beam failure detection for the target cell, and sends the indication information to a network side device based on the detection result of the beam failure detection. Specific implementations of the detection operation of beam failure detection performed by the mobile communication terminal for the target cell can be implemented with reference to step 101 of the embodiment shown in FIG. 1. To avoid repetition, details are not described herein.

It should be noted that the detection result further includes a result of beam failure recovery condition detection performed for the target cell. To be specific, the mobile communication terminal performs the detection operation in the target cell, where the detection operation includes at least beam failure detection and beam failure recovery condition detection. The mobile communication terminal can send, to the network side device, the indication information used to indicate a beam failure when a beam failure event is detected, and when it is detected that a beam failure recovery condition is not satisfied, that is, the condition for beam failure recovery is not met. Therefore, the network side device can receive the indication information reported by the mobile communication terminal after the beam failure is detected, to help the network side device take a measure against the beam failure. Specific implementations of the beam failure recovery condition detection performed by the mobile communication terminal for the target cell and the indication information reported by the mobile communication terminal based on the detection result can be implemented with reference to step 102 of the embodiment shown in FIG. 1. To avoid repetition, details are not described herein.

Step 202: Perform, based on the indication information, a second operation of accelerating beam failure processing.

It can be understood that, when receiving the indication information that indicates the beam failure and that is sent by the mobile communication terminal, the network side device performs, based on the indication information, the second operation of accelerating beam failure processing. Specifically, the second operation includes at least one of the following operations:

initiating cell re-establishment;

initiating a cell handover;

initiating a related procedure subsequent to a primary secondary cell PSCell or secondary cell SCell failure;

initiating a change procedure of a primary secondary cell PSCell or secondary cell SCell;

initiating a cell release procedure of a primary secondary cell PSCell or secondary cell SCell;

initiating a cell addition procedure of a primary secondary cell PSCell or secondary cell SCell;

initiating a procedure of activating an available reference signal in the target cell;

indicating an available reference signal on a secondary cell SCell, primary cell PCell, primary secondary cell PSCell, and/or special cell SpCell to the mobile communication terminal;

indicating a new available reference signal to the mobile communication terminal by using a secondary cell SCell, a primary cell PCell, a primary secondary cell PSCell, and/or a special cell SpCell; and responding to the mobile communication terminal by using a new available reference signal on a secondary cell SCell, primary cell PCell, primary secondary cell PSCell, and/or special cell SpCell.

The initiating cell re-establishment may be: performing cell search, and perform cell re-establishment based on a cell search result; may be: performing cell re-establishment for the target cell, or for a neighboring cell of the target cell, or for any detected cell that satisfies a preset criterion (such as criterion S). In addition, the initiating a cell handover may be: performing a cell handover based on a preset criterion (such as criterion R), for example, may be: performing criterion R ranking on candidate cells by quality, and selecting an optimal cell for the handover, so that the mobile communication terminal is handed over from the target cell in which the beam failure is detected to the candidate cell, so as to ensure a wireless communication connection of the mobile communication terminal.

In addition, the network side device may initiate, based on the received indication information sent by the mobile communication terminal, the related procedure subsequent to the PSCell failure and/or SCell failure, for example, initiate beam failure recovery for the PSCell, or initiate beam failure recovery for the SCell. Alternatively, the network side device may initiate the PSCell and/or SCell change procedure based on the indication information, for example, when a target cell SCell with a beam failure is detected, change the SCell to another candidate cell. Alternatively, the network side device may initiate the cell release procedure of the PSCell and/or SCell or initiate the cell addition procedure of the PSCell and/or SCell based on the indication information.

In addition, the indication information sent by the mobile communication terminal may include measurement performance information used to indicate that the target cell has no available reference signal of the candidate beam, and the network side device may initiate, based on the received indication information, a procedure of activating an available reference signal of the target cell, to activate the available reference signal of the target cell so that the target cell performs beam failure recovery.

In addition, the network side device may indicate an available reference signal on the PCell, PSCell, SpCell and/or SCell to the mobile communication terminal based on the received indication information, so that the mobile communication terminal implements a communication connection to the target cell; or indicate a new available reference signal to the mobile communication terminal by using the PCell, PSCell, SpCell, and/or SCell; or respond to the mobile communication terminal by using a new available reference signal on the PCell, PSCell, SpCell, and/or SCell, so that the mobile communication terminal activates a corresponding beam based on the new available reference signal, so as to implement the communication connection to the target cell.

In the technical solution provided in this embodiment of the present disclosure, the network side device receives the indication information sent by the mobile communication terminal based on the detection result, where the detection result includes at least the result of beam failure detection performed for the target cell; and performs, based on the indication information, the second operation of accelerating beam failure processing. In this way, the network side device can perform, based on the received indication information, the operation of accelerating beam failure processing for the target cell with the beam failure, to quickly complete the beam failure recovery, improve a cell beam failure processing capability, and ensure stability of the communication connection to the mobile communication terminal.

Figure 3:
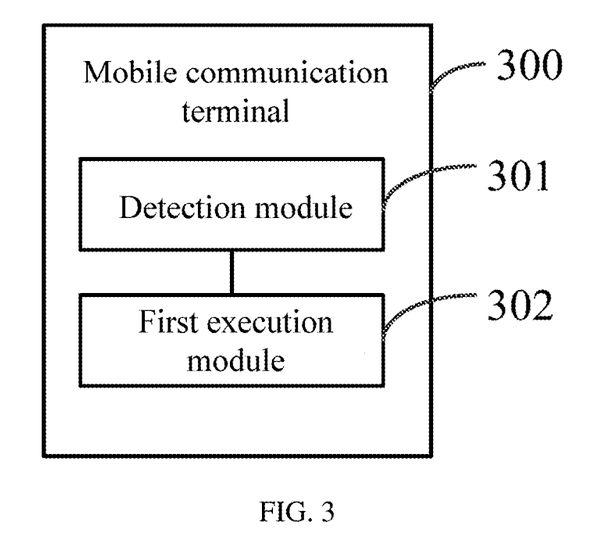
FIG. 3 is a structural diagram of a mobile communication terminal according to an embodiment of the present disclosure.

Referring to FIG. 3, FIG. 3 is a structural diagram of a mobile communication terminal according to an embodiment of the present disclosure. As shown in FIG. 3, the mobile communication terminal 300 includes:

a detection module 301, configured to perform a detection operation in a target cell, where the detection operation includes at least beam failure detection; and a first execution module 302, configured to perform, in the target cell based on a detection result, a first operation of accelerating beam failure processing.

Optionally, the detection operation further includes beam failure recovery condition detection, and the first execution module 302 is further configured to:

when a beam failure event is detected during the beam failure detection and a beam failure recovery condition is not satisfied, perform, in the target cell, the first operation of accelerating the beam failure processing.

Optionally, the beam failure recovery condition includes at least one of the following conditions:

whether there is an available candidate beam in the target cell;

whether the target cell has an available resource for performing a beam failure recovery procedure; and whether a beam failure recovery failure event corresponding to the detected beam failure event occurs in the target cell.

Optionally, whether the target cell has an available resource for performing a beam failure recovery procedure specifically includes at least one of the following conditions:

whether the target cell is configured with a first resource used for a contention-free random access CFRA procedure, or whether the target cell is configured with a second resource, where the second resource is a resource used for a CFRA procedure that supports beam failure recovery;

whether a reference signal on the second resource meets a measurement performance requirement;

whether the target cell is configured with a third resource used for a contention-based random CBRA procedure, or whether the target cell is configured with a fourth resource, where the fourth resource is a resource that can be used for a CBRA procedure that supports beam failure recovery; and whether a reference signal on the fourth resource meets the measurement performance requirement.

Optionally, the beam failure detection is specifically: determining, based on measurement performance information obtained by performing detection on a target reference signal in the target cell, whether a beam failure event is detected.

Optionally, the target reference signal includes at least one of the following reference signals:

a reference signal configured for the target cell and used for beam failure detection;

a reference signal configured for the target cell and used for a beam failure event;

a reference signal configured for the target cell and used for beam management;

a reference signal that can be detected on the target cell; and a preset quantity of reference signals configured for the target cell.

Optionally, the first operation includes at least one of the following operations:

directly initiating the beam failure recovery procedure;

directly triggering a radio link failure RLF;

indicating an upper-layer beam failure instance; and reporting indication information to a network side.

Optionally, the indication information is carried in a MAC CE, a PUCCH, or an RRC message;

or, the indication information is reported by using an SCell, PCell, PSCell or SpCell.

Optionally, the indication information includes at least one of the following information:

first information, used to indicate a beam failure on an SCell, PCell, PSCell, and/or SpCell;

second information, used to indicate a quantity of target reference signals and/or measurement performance information not satisfying the measurement performance requirement;

third information, used to indicate that the target cell has no available candidate beam and/or no measurement performance information of a reference signal of the candidate beam;

fourth information, used to indicate that the target cell has no available resource for performing the beam failure recovery procedure;

fifth information, used to indicate the measurement performance information of a reference signal;

sixth information, used to indicate an alternative beam selected by the mobile communication terminal;

eighth information, used to indicate an event that a preset quantity of reference signals fail;

ninth information, used to indicate an event that a preset reference signal fails and/or a reference signal corresponding to the candidate beam fails;

tenth message, used to indicate an additional reference signal for displaying a configuration;

eleventh information, used to indicate measurement performance information of a reference signal of a resource used for CBRA; and twelfth information, used to indicate measurement performance information of a reference signal, where the reference signal includes at least one of: a reference signal of the candidate beam, reference signals of all beams, a preset quantity of reference signals, and a reference signal of a preset beam.

It should be noted that the mobile communication terminal 300 can implement processes of the embodiment of the cell beam failure processing method shown in FIG. 1 and achieve a same technical effect. To avoid repetition, details are not described herein again.

In this embodiment of the present disclosure, the mobile communication terminal 300 performs the detection operation including at least beam failure detection in the target cell, and performs, in the target cell based on the detection result, the first operation of accelerating the beam failure processing. In this way, when a beam failure is detected in the target cell, the first operation such as directly initiating the beam failure recovery procedure or reporting the indication information to the network side can be performed, to accelerate beam failure processing for the target cell with the beam failure, so as to quickly complete the beam failure recovery, and improve a cell beam failure processing capability of the mobile communication terminal 300.

Figure 4:
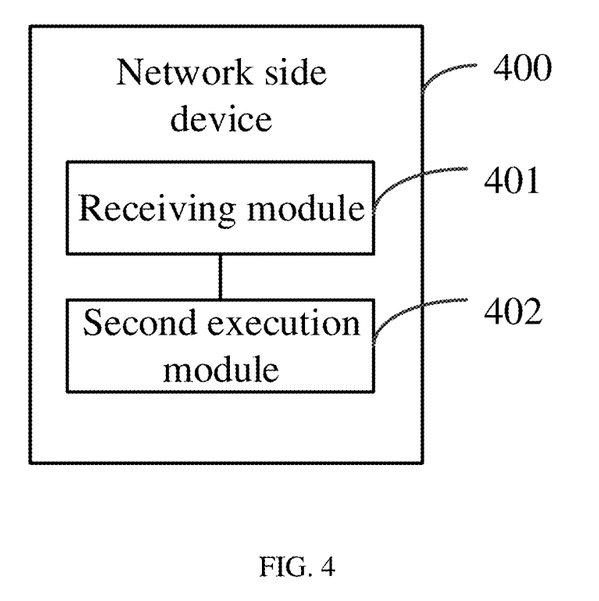
FIG. 4 is a structural diagram of a network side device according to an embodiment of the present disclosure.

Referring to FIG. 4, FIG. 4 is a structural diagram of a network side device according to an embodiment of the present disclosure. As shown in FIG. 4, the network side device 400 includes:

a receiving module 401, configured to receive indication information sent by a mobile communication terminal based on a detection result, where the detection result includes at least a result of beam failure detection performed for a target cell; and a second execution module 402, configured to perform, based on the indication information, a second operation of accelerating beam failure processing.

Optionally, the detection result further includes: a result of beam failure recovery condition detection performed for the target cell.

Optionally, the second operation includes at least one of the following operations:

initiating cell re-establishment;

initiating a cell handover;

initiating a related procedure subsequent to a PSCell and/or SCell failure;

initiating a change procedure of a PSCell and/or SCell;

initiating a cell release procedure of a PSCell and/or SCell;

initiating a cell addition procedure of a PSCell and/or SCell;

initiating a procedure of activating an available reference signal in the target cell;

indicating an available reference signal on an SCell, PCell, PSCell, and/or SpCell to the mobile communication terminal;

indicating a new available reference signal to the mobile communication terminal by using a PCell, PSCell, SpCell, and/or SCell; and responding to the mobile communication terminal by using a new available reference signal on a PCell, PSCell, SpCell and/or SCell.

It should be noted that the network side device 400 can implement processes of the embodiment of the cell beam failure processing method shown in FIG. 2 and achieve a same technical effect. To avoid repetition, details are not described herein again.

In this embodiment of the present disclosure, the network side device 400 receives the indication information sent by the mobile communication terminal based on the detection result, where the detection result includes at least the result of beam failure detection performed for the target cell; and performs, based on the indication information, the second operation of accelerating beam failure processing. In this way, the network side device 400 can perform, based on the received indication information, the operation of accelerating beam failure processing for a target cell with a beam failure, to quickly complete the beam failure recovery, improve a cell beam failure processing capability, and ensure stability of a communication connection to the mobile communication terminal.

Figure 5:
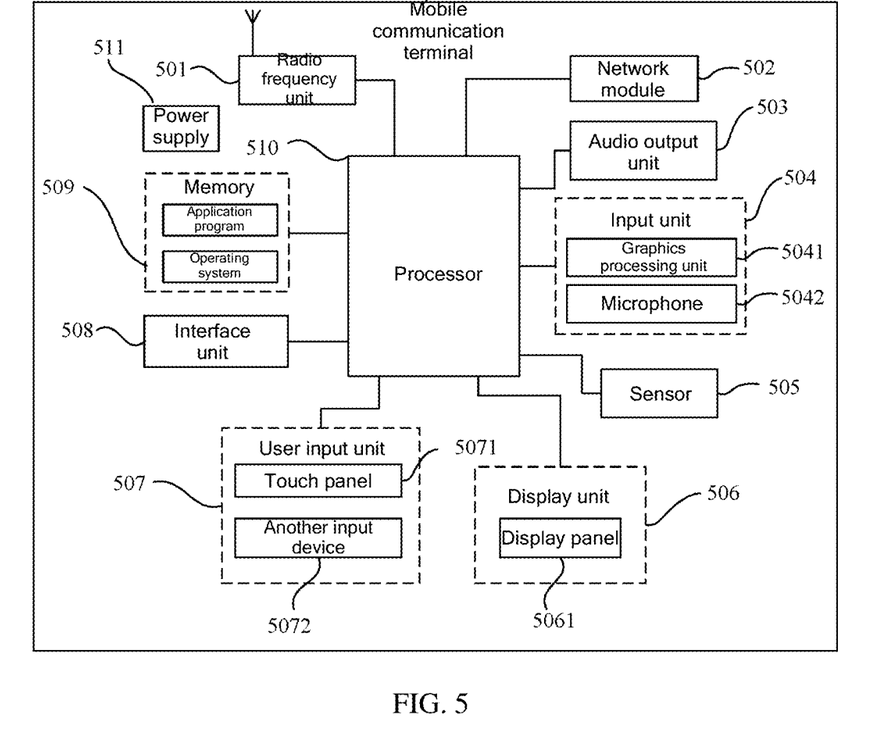
FIG. 5 is a structural diagram of another mobile communication terminal according to an embodiment of the present disclosure.

Referring to FIG. 5, FIG. 5 is a structural diagram of another mobile communication terminal for implementing an embodiment of the present disclosure. The mobile communication terminal 500 can implement processes of the embodiment of the cell beam failure processing method shown in FIG. 1 and achieve a same technical effect. As shown in FIG. 5, the mobile communication terminal 500 includes but is not limited to: components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that the structure of the mobile communication terminal shown in FIG. 5 does not constitute a limitation on the mobile communication terminal, and the mobile communication terminal may include more or fewer components than those shown in the figure, or combine some components, or have different component arrangements. In this embodiment of the present disclosure, the mobile communication terminal includes, but is not limited to, a mobile phone, a tablet computer, a laptop computer, a palmtop computer, a vehicle-mounted terminal, a wearable device, a pedometer, and the like.

The processor 510 is configured to:

perform a detection operation in a target cell, where the detection operation includes at least beam failure detection; and perform, in the target cell based on a detection result, a first operation of accelerating beam failure processing.

The detection operation further includes beam failure recovery condition detection, and the processor 510 is further configured to:

when a beam failure event is detected during the beam failure detection and a beam failure recovery condition is not satisfied, perform, in the target cell, the first operation of accelerating the beam failure processing.

Optionally, the beam failure recovery condition includes at least one of the following conditions:

whether there is an available candidate beam in the target cell;

whether the target cell has an available resource for performing a beam failure recovery procedure; and whether a beam failure recovery failure event corresponding to the detected beam failure event occurs in the target cell.

Optionally, whether the target cell has an available resource for performing a beam failure recovery procedure specifically includes at least one of the following conditions:

whether the target cell is configured with a first resource used for a contention-free random access CFRA procedure;

whether the target cell is configured with a second resource, where the second resource is a resource used for a CFRA procedure that supports beam failure recovery;

whether a reference signal on the second resource meets a measurement performance requirement;

whether the target cell is configured with a third resource used for a contention-based random CBRA procedure;

whether the target cell is configured with a fourth resource, where the fourth resource is a resource that can be used for a CBRA procedure that supports beam failure recovery; and whether a reference signal on the fourth resource meets the measurement performance requirement.

Optionally, the beam failure detection is specifically: determining, based on measurement performance information obtained by performing detection on a target reference signal in the target cell, whether a beam failure event is detected.

Optionally, the target reference signal includes at least one of the following reference signals:

a reference signal configured for the target cell and used for beam failure detection;

a reference signal configured for the target cell and used for a beam failure event;

a reference signal configured for the target cell and used for beam management;

a reference signal that can be detected on the target cell; and a preset quantity of reference signals configured for the target cell.

Optionally, the first operation includes at least one of the following operations:

directly initiating the beam failure recovery procedure;

directly triggering a radio link failure RLF;

indicating an upper-layer beam failure instance; and reporting indication information to a network side.

Optionally, the indication information is carried in a MAC CE, a PUCCH, or an RRC message;

or, the indication information is reported by using an SCell, PCell, PSCell or SpCell.

Optionally, the indication information includes at least one of the following information:

first information, used to indicate a beam failure on an SCell, PCell, PSCell, and/or SpCell;

second information, used to indicate a quantity of target reference signals and/or measurement performance information not satisfying the measurement performance requirement;

third information, used to indicate that the target cell has no available candidate beam and/or no measurement performance information of a reference signal of the candidate beam;

fourth information, used to indicate that the target cell has no available resource for performing the beam failure recovery procedure;

fifth information, used to indicate the measurement performance information of a reference signal;

sixth information, used to indicate an alternative beam selected by the mobile communication terminal;

eighth information, used to indicate an event that a preset quantity of reference signals fail;

ninth information, used to indicate an event that a preset reference signal fails and/or a reference signal corresponding to the candidate beam fails;

tenth message, used to indicate an additional reference signal for displaying a configuration;

eleventh information, used to indicate measurement performance information of a reference signal of a resource used for CBRA; and twelfth information, used to indicate measurement performance information of a reference signal, where the reference signal includes at least one of: a reference signal of the candidate beam, reference signals of all beams, a preset quantity of reference signals, and a reference signal of a preset beam.

In this embodiment of the present disclosure, the mobile communication terminal 500 performs the detection operation including at least beam failure detection in the target cell, and, performs, in the target cell based on the detection result, the first operation of accelerating the beam failure processing. In this way, when a beam failure is detected in the target cell, the first operation such as directly initiating the beam failure recovery procedure or reporting the indication information to the network side can be performed, to accelerate beam failure processing for a target cell with a beam failure, so as to quickly complete the beam failure recovery, and improve a cell beam failure processing capability of the mobile communication terminal 500.

It should be understood that in this embodiment of the present disclosure, the radio frequency unit 501 may be configured to receive and send signals in a process of receiving and sending information or calling. Specifically, after receiving downlink data from a base station, the radio frequency unit 501 sends the downlink data to the processor 510 for processing; and sends uplink data to the base station. Generally, the radio frequency unit 501 includes, but is not limited to, an antenna, at least one amplifier, a transceiver, a coupler, a low noise amplifier, a duplexer, and the like. In addition, the radio frequency unit 501 may further communicate with a network and another device by using a wireless communication system.

The mobile communication terminal 500 provides wireless broadband internet access for a user by using a network module 502, for example, helping the user send and receive an email, browse a web page, and access streaming media.

The audio output unit 503 may convert audio data received by the radio frequency unit 501 or the network module 502 or stored in the memory 509 into an audio signal and output the audio signal as sound. Moreover, the audio output unit 503 may further provide audio output (for example, call signal receiving sound and message receiving sound) related to a specific function executed by the mobile communication terminal 500. The audio output unit 503 includes a speaker, a buzzer, a telephone receiver, and the like.

The input unit 504 is configured to receive an audio or video signal. The input unit 504 can include a graphics processing unit (GPU) 5041 and a microphone 5042. The graphics processing unit 5041 processes image data of static pictures or videos obtained by an image capturing apparatus (for example, a camera) in a video capturing mode or an image capturing mode. A processed image frame can be displayed on the display unit 506. The image frame processed by the graphics processing unit 5041 may be stored in the memory 509 (or another computer-readable storage medium) or sent by using the radio frequency unit 501 or the network module 502. The microphone 5042 may receive sound and can process such sound into audio data. Processed audio data may be converted, in telephone call mode, into a format that can be sent to a mobile communication base station via the radio frequency unit 501 for output.

The mobile communication terminal 500 further includes at least one sensor 505, such as an optical sensor, a motion sensor, and another sensor. Specifically, the optical sensor includes an ambient light sensor and a proximity sensor. The ambient light sensor may adjust luminance of the display panel 5051 based on brightness of ambient light, and the proximity sensor may turn off the display panel 5051 and/or backlight when the mobile communication terminal 500 approaches an ear. As a type of the motion sensor, an accelerometer sensor may detect magnitude of an acceleration in each direction (generally three axes), and may detect magnitude and a direction of gravity when the mobile communication terminal is static. The accelerometer sensor may be configured to recognize a mobile communication terminal gesture (for example, landscape/portrait screen switching, a related game, or magnetometer posture calibration), a vibration recognition related function (for example, a pedometer or a strike), or the like. The sensor 505 may further include a fingerprint sensor, a pressure sensor, an iris sensor, a molecular sensor, a gyroscope, a barometer, a hygrometer, a thermometer, an infrared sensor, and the like. Details are not described herein.

The display unit 506 is configured to display information entered by the user or information provided for the user. The display unit 506 can include a display panel 5061. The display panel 5061 can be configured in a form of liquid crystal display (LCD), organic light-emitting diode (OLED), and the like.

The user input unit 507 may be configured to receive input digits or character information and generate key signal input related to user setting and function control of the mobile communication terminal 500. Specifically, the user input unit 507 includes a touch panel 5071 and another input device 5072. The touch panel 5071, also referred to as a touchscreen, may collect a touch operation performed by the user on or near the touch panel 5071 (for example, an operation performed by the user on or near the touch panel 5071 by using any suitable object or accessory such as a finger or a stylus). The touch panel 5071 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 510, and receives and executes a command from the processor 510. In addition, the touch panel 5071 may be implemented by using a plurality of types such as a resistive type, a capacitive type, an infrared ray, and a surface acoustic wave. The user input unit 507 may include the another input device 5072 in addition to the touch panel 5071. Specifically, the another input device 5072 may include but is not limited to one or more of a physical keyboard, a function key (such as a volume control key or an on/off key), a trackball, a mouse, a joystick, and the like. Details are not described herein again.

Further, the touch panel 5071 may cover the display panel 5061. After detecting the touch operation on or near the touch panel 5071, the touch panel 5071 transmits the touch operation to the processor 510 to determine a type of a touch event, and then the processor 510 provides corresponding visual output on the display panel 5061 based on the type of the touch event. In FIG. 5, the touch panel 5071 and the display panel 5061 are used as two independent components to implement input and output functions of the mobile communication terminal. However, in some embodiments, the touch panel 5071 and the display panel 5061 may be integrated to implement the input and output functions of the mobile communication terminal 500. This is not specifically limited herein.

The interface unit 508 is an interface connecting an external apparatus and the mobile communication terminal 500. For example, the external apparatus can include a wired or wireless headphone port, an external power supply (or a battery recharger) port, a wired or wireless data port, a memory card port, a port for connection to an apparatus having an identification module, an audio input/output (I/O) port, a video I/O port, an earphone port, and the like. The interface unit 508 may be configured to receive input (such as data information and power) from the external apparatus and transmit the received input to one or more elements in the mobile communication terminal 500, or may be configured to transmit data between the mobile communication terminal 500 and the external apparatus.

The memory 509 may be configured to store a software program and various data. The memory 509 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 509 may include a high-speed random access memory, and may further include a nonvolatile memory, for example, at least one disk storage device, a flash memory, or another nonvolatile solid-state storage device.

The processor 510 is a control center of the mobile communication terminal 500, and is connected to various parts of the entire mobile communication terminal 500 by using various interfaces and lines, and performs various functions of the mobile communication terminal 500 and processes data by running or executing a software program and/or module stored in the memory 509 and invoking the data stored in the memory 509, to implement overall monitoring on the mobile communication terminal 500. The processor 510 may include one or more processing units. Optionally, the processor 510 may integrate an application processor and a modem processor. The application processor mainly processes an operating system, a user interface, an application program, and the like. The modem processor mainly processes wireless communication. It may be understood that alternatively, the modem processor may not be integrated into the processor 510.

The mobile communication terminal 500 may further include a power supply 511 (such as a battery) that supplies power to each component. Optionally, the power supply 511 may be logically connected to the processor 510 by using a power supply management system, to implement functions such as charging, discharging, and power consumption management by using the power supply management system.

In addition, the mobile communication terminal 500 includes some function modules not shown, and details are not described herein.

Optionally, an embodiment of the present disclosure further provides a mobile communication terminal, including: a processor, a memory, and a computer program stored in the memory and executable on the processor. The computer program, when executed by the processor, implements processes of the embodiments of the foregoing cell beam failure processing method, and can achieve a same technical effect. To avoid repetition, details are not described herein again.

Figure 6:
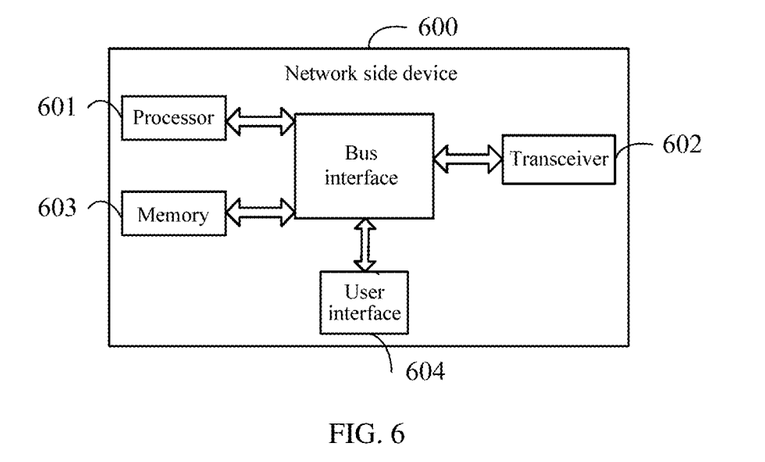
FIG. 6 is a structural diagram of another network side device according to an embodiment of the present disclosure.

Referring to FIG. 6, FIG. 6 is a structural diagram of another network side device for implementing an embodiment of the present disclosure. The network side device 600 can implement processes of the embodiment of the cell beam failure processing method shown in FIG. 2 and achieve a same technical effect. As shown in FIG. 6, the network side device 600 includes: a processor 601, a transceiver 602, a memory 603, a user interface 604, and a bus interface.

The processor 601 is configured to read a program in the memory 603 and perform the following processes:

receiving indication information sent by a mobile communication terminal based on a detection result, where the detection result includes at least a result of beam failure detection performed for a target cell; and performing, based on the indication information, a second operation of accelerating beam failure processing.

In FIG. 6, a bus architecture may include any quantity of interconnected buses and bridges, which are specifically connected together by various circuits of one or more processors represented by the processor 601 and a memory represented by the memory 603. The bus architecture may further connect together various other circuits of a peripheral device, a voltage stabilizer, a power management circuit, and the like, which are known in this art and will not be further described herein. The bus interface provides an interface. The transceiver 602 may include a plurality of elements, that is, include a transmitter and a receiver, and provide units for communication with various other apparatuses on a transmission medium. For different user equipment, the user interface 604 may alternatively be an interface for externally and internally connecting required equipment. The connected equipment includes but is not limited to a keypad, a display, a speaker, a microphone, a joystick, and the like.

The processor 601 is responsible for managing the bus architecture and common processing, and the memory 603 may store data used when the processor 601 performs an operation.

Optionally, the detection result further includes: a result of beam failure recovery condition detection performed for the target cell.

Optionally, the second operation includes at least one of the following operations:

initiating cell re-establishment;

initiating a cell handover;

initiating a related procedure subsequent to a PSCell and/or SCell failure;

initiating a change procedure of a PSCell and/or SCell;

initiating a cell release procedure of a PSCell and/or SCell;

initiating a cell addition procedure of a PSCell and/or SCell;

initiating a procedure of activating an available reference signal in the target cell;

indicating an available reference signal on an SCell, PCell, PSCell, and/or SpCell to the mobile communication terminal;

indicating a new available reference signal to the mobile communication terminal by using a PCell, PSCell, SpCell, and/or SCell; and responding to the mobile communication terminal by using a new available reference signal on a PCell, PSCell, SpCell and/or SCell.

In this embodiment of the present disclosure, the network side device 600 receives the indication information sent by the mobile communication terminal based on the detection result, where the detection result includes at least the result of beam failure detection performed for the target cell; and performs, based on the indication information, the second operation of accelerating beam failure processing. In this way, the network side device 600 can perform, based on the received indication information, the operation of accelerating beam failure processing for a target cell with a beam failure, to quickly complete the beam failure recovery, improve a cell beam failure processing capability, and ensure stability of a communication connection to the mobile communication terminal.

An embodiment of the present disclosure further provides a computer readable storage medium, where the computer readable storage medium stores a computer program, and the computer program, when executed by a processor, implements processes of the foregoing embodiments of the cell beam failure processing method, and can achieve a same technical effect. To avoid repetition, details are not described herein again. The computer readable storage medium is, for example, a read-only memory (ROM for short), a random access memory (RAM for short), a magnetic disk, or an optical disc.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. Without being subject to further limitations, an element defined by a phrase "including a . . . " does not exclude presence of other identical elements in the process, method, article, or apparatus that includes the very element.

According to the foregoing descriptions of the implementations, a person skilled in the art may clearly understand that the foregoing methods in the embodiments may be implemented by using software and a required universal hardware platform, or certainly may be implemented by using hardware. However, in many cases, the former is a better implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A cell beam failure processing method, applied to a mobile communication terminal, and comprising:

performing a detection operation in a target cell, wherein the detection operation comprises at least beam failure detection; and performing, in the target cell based on a detection result of a physical layer of the mobile communication terminal, a first operation of accelerating beam failure processing;

wherein the first operation comprises at least one of the following operations:
directly initiating the beam failure recovery procedure;
directly triggering a radio link failure RLF;
indicating an upper-layer beam failure instance.

2. The cell beam failure processing method according to claim 1, wherein the detection operation further comprises beam failure recovery condition detection, and the performing, in the target cell based on a detection result, a first operation of accelerating beam failure processing is specifically:
when a beam failure event is detected during the beam failure detection and a beam failure recovery condition is not satisfied, performing, in the target cell, the first operation of accelerating the beam failure processing.

3. The cell beam failure processing method according to claim 2, wherein the beam failure recovery condition comprises at least one of the following conditions:
whether there is an available candidate beam in the target cell;
whether the target cell has an available resource for performing a beam failure recovery procedure; and
whether a beam failure recovery failure event corresponding to the detected beam failure event occurs in the target cell.

4. The cell beam failure processing method according to claim 3, wherein whether the target cell has an available resource for performing a beam failure recovery procedure specifically comprises at least one of the following conditions:
whether the target cell is configured with a first resource used for a contention-free random access CFRA procedure, or whether the target cell is configured with a second resource, wherein the second resource is a resource used for a CFRA procedure that supports beam failure recovery;
whether a reference signal on the second resource meets a measurement performance requirement;
whether the target cell is configured with a third resource used for a contention-based random CBRA procedure, or whether the target cell is configured with a fourth resource, wherein the fourth resource is a resource that can be used for a CBRA procedure that supports beam failure recovery; and
whether a reference signal on the fourth resource meets the measurement performance requirement.

5. The cell beam failure processing method according to claim 1, wherein the beam failure detection is specifically:
determining, based on measurement performance information obtained by performing detection on a target reference signal on the target cell, whether a beam failure event is detected.

6. The cell beam failure processing method according to claim 5, wherein the target reference signal comprises at least one of the following reference signals:
a reference signal configured for the target cell and used for beam failure detection;
a reference signal configured for the target cell and used for a beam failure event;
a reference signal configured for the target cell and used for beam management;
a reference signal that can be detected on the target cell; and
a preset quantity of reference signals configured for the target cell.

7. The cell beam failure processing method according to claim 1, wherein the indication information is carried by a Media Access Control control element MAC CE, a physical uplink control channel PUCCH, or a radio resource control RRC message;
and/or
the indication information is reported through a secondary cell SCell, a primary cell PCell, a primary secondary cell PSCell, or a special cell SpCell.

8. The cell beam failure processing method according to claim 1, wherein the indication information comprises at least one of the following:
first information, used to indicate a beam failure on the secondary cell SCell, the primary cell PCell, the primary secondary cell PSCell, and/or the special cell SpCell;
second information, used to indicate a quantity of target reference signals and/or measurement performance information not satisfying the measurement performance requirement;
third information, used to indicate that the target cell has no available candidate beam and/or no measurement performance information of a reference signal of the candidate beam;
fourth information, used to indicate that the target cell has no available resource for performing the beam failure recovery procedure;
fifth information, used to indicate the measurement performance information of a reference signal;
sixth information, used to indicate an alternative beam selected by the mobile communication terminal;
eighth information, used to indicate an event that a preset quantity of reference signals fail;
ninth information, used to indicate an event that a preset reference signal fails and/or a reference signal corresponding to the candidate beam fails;
tenth message, used to indicate an additional reference signal for displaying a configuration;
eleventh information, used to indicate measurement performance information of a reference signal of a resource used for contention-based random access CBRA; and
twelfth information, used to indicate measurement performance information of a reference signal, wherein the reference signal comprises at least one of: a reference signal of the candidate beam, reference signals of all beams, a preset quantity of reference signals, and a reference signal of a preset beam.

9. A cell beam failure processing method, applied to a network side, and comprising:
receiving indication information sent by a mobile communication terminal based on a detection result of a physical layer of the mobile communication terminal, wherein the detection result comprises at least a result of beam failure detection performed for a target cell; and
performing, based on the indication information, a second operation of accelerating beam failure processing;
wherein the second operation comprises at least one of the following operations:
initiating cell re-establishment;
initiating a related procedure subsequent to a primary secondary cell PSCell or secondary cell SCell failure;
initiating a change procedure of a primary secondary cell PSCell or secondary cell SCell;
initiating a cell release procedure of a primary secondary cell PSCell or secondary cell SCell;

initiating a cell addition procedure of a primary secondary cell PSCell or secondary cell SCell;
initiating a procedure of activating an available reference signal in the target cell;
indicating an available reference signal on a secondary cell SCell, primary cell PCell, primary secondary cell PSCell, and/or special cell SpCell to the mobile communication terminal;
indicating a new available reference signal to the mobile communication terminal by using a secondary cell SCell, a primary cell PCell, a primary secondary cell PSCell, and/or a special cell SpCell; and
responding to the mobile communication terminal by using a new available reference signal on a secondary cell SCell, primary cell PCell, primary secondary cell PSCell, and/or special cell SpCell.

10. A network side device, comprising: a memory, a processor, transceiver, and a computer program stored in the memory and executable on the processor, wherein the computer program, when executed by the processor, implements steps in the cell beam failure processing method according to claim 9.

11. The cell beam failure processing method according to claim 9, wherein the detection result further comprises a result of beam failure recovery condition detection performed for the target cell.

12. A mobile communication terminal, comprising: a memory, a processor, and a computer program stored in the memory and executable on the processor, wherein the computer program, when executed by the processor, implements steps:
performing a detection operation in a target cell, wherein the detection operation comprises at least beam failure detection; and
performing, in the target cell based on a detection result of a physical layer of the mobile communication terminal, a first operation of accelerating beam failure processing;
wherein the first operation comprises at least one of the following operations:
directly initiating the beam failure recovery procedure;
directly triggering a radio link failure RLF;
indicating an upper-layer beam failure instance.

13. The mobile communication terminal according to claim 12, wherein the detection operation further comprises beam failure recovery condition detection;
the processor is configured to:
when a beam failure event is detected during the beam failure detection and a beam failure recovery condition is not satisfied, perform, in the target cell, the first operation of accelerating the beam failure processing.

14. The mobile communication terminal according to claim 13, wherein the beam failure recovery condition comprises at least one of the following conditions:
whether there is an available candidate beam in the target cell;
whether the target cell has an available resource for performing a beam failure recovery procedure; and
whether a beam failure recovery failure event corresponding to the detected beam failure event occurs in the target cell.

15. The mobile communication terminal according to claim 14, wherein whether the target cell has an available resource for performing a beam failure recovery procedure specifically comprises at least one of the following conditions:

whether the target cell is configured with a first resource used for a contention-free random access CFRA procedure, or whether the target cell is configured with a second resource, wherein the second resource is a resource used for a CFRA procedure that supports beam failure recovery;
whether a reference signal on the second resource meets a measurement performance requirement;
whether the target cell is configured with a third resource used for a contention-based random CBRA procedure, or whether the target cell is configured with a fourth resource, wherein the fourth resource is a resource that can be used for a CBRA procedure that supports beam failure recovery; and
whether a reference signal on the fourth resource meets the measurement performance requirement.

16. The mobile communication terminal according to claim 12, wherein the processor is configured to, determine, based on measurement performance information obtained by performing detection on a target reference signal on the target cell, whether a beam failure event is detected;
wherein the target reference signal comprises at least one of the following reference signals:
a reference signal configured for the target cell and used for beam failure detection;
a reference signal configured for the target cell and used for a beam failure event;
a reference signal configured for the target cell and used for beam management;
a reference signal that can be detected on the target cell; and
a preset quantity of reference signals configured for the target cell.

17. The mobile communication terminal according to claim 12, wherein
the indication information is carried by a Media Access Control control element MAC CE, a physical uplink control channel PUCCH, or a radio resource control RRC message;
and/or
the indication information is reported through a secondary cell SCell, a primary cell PCell, a primary secondary cell PSCell, or a special cell SpCell;
and/or,
the indication information comprises at least one of the following:
first information, used to indicate a beam failure on the secondary cell SCell, the primary cell PCell, the primary secondary cell PSCell, and/or the special cell SpCell;
second information, used to indicate a quantity of target reference signals and/or measurement performance information not satisfying the measurement performance requirement;
third information, used to indicate that the target cell has no available candidate beam and/or no measurement performance information of a reference signal of the candidate beam;
fourth information, used to indicate that the target cell has no available resource for performing the beam failure recovery procedure;
fifth information, used to indicate the measurement performance information of a reference signal;
sixth information, used to indicate an alternative beam selected by the mobile communication terminal;
eighth information, used to indicate an event that a preset quantity of reference signals fail;

ninth information, used to indicate an event that a preset reference signal fails and/or a reference signal corresponding to the candidate beam fails;

tenth message, used to indicate an additional reference signal for displaying a configuration;

eleventh information, used to indicate measurement performance information of a reference signal of a resource used for contention-based random access CBRA; and twelfth information, used to indicate measurement performance information of a reference signal, wherein the reference signal comprises at least one of: a reference signal of the candidate beam, reference signals of all beams, a preset quantity of reference signals, and a reference signal of a preset beam.

* * * * *